(12) United States Patent  
Kato et al.

(10) Patent No.: US 6,542,319 B2  
(45) Date of Patent: Apr. 1, 2003

(54) PICKUP DEVICE

(75) Inventors: Takahiro Kato, Saitama (JP); Jun Miyamori, Saitama (JP); Kuniya Satomi, Saitama (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/777,823

(22) Filed: Feb. 7, 2001

(65) Prior Publication Data

US 2001/0012162 A1 Aug. 9, 2001

(30) Foreign Application Priority Data

Feb. 8, 2000 (JP) .................................. 2000-030514

(51) Int. Cl.[7] .................. G02B 7/02; G02B 27/40; G11B 7/00; G01C 1/00
(52) U.S. Cl. .................. 359/822; 359/819; 359/814; 369/112.17; 356/138; 250/201.4
(58) Field of Search ................. 359/822, 819, 359/813, 814, 874; 369/112.17, 112.2; 356/138, 623; 250/201.4

(56) References Cited

U.S. PATENT DOCUMENTS

| | | | | |
|---|---|---|---|---|
| 5,508,851 A | * | 4/1996 | Tachizawa | 359/822 |
| 5,553,052 A | | 9/1996 | Oono et al. | |
| 5,883,709 A | | 3/1999 | Okuda et al. | |
| 6,198,580 B1 | * | 3/2001 | Dallakian | 359/822 |
| 6,222,687 B1 | * | 4/2001 | Nagashima | 359/819 |

FOREIGN PATENT DOCUMENTS

EP    0 341 936 A2    11/1989

\* cited by examiner

*Primary Examiner*—Loha Ben  
(74) *Attorney, Agent, or Firm*—Sughrue Mion, PLLC

(57) ABSTRACT

A pickup device has a light source, an objective lens for converging rays of light emitted from a light source onto a recording medium, a lens holder for holding the objective lens, and supporting element for movably supporting the lens holder. The pickup device is uniquely featured in that a part of the objective lens and a part of the lens holder are movable relative to each other so as to adjust an inclination of an optical axis of the objective lens.

5 Claims, 6 Drawing Sheets

PICKUP DEVICE

BACKGROUND OF THE INVENTION

1. Field of the Invention

The present invention relates to a pickup device mounted on an information recording medium playback device. More particularly, the invention relates to a pickup device for recording information into and reproducing the same from an information recording medium, such as CD (compact disk) or DVD (digital video disc, digital versatile disc).

2. Description of the Related Art

In the pickup device mounted on the information recording medium reproduction device, to accurately read information, which is optically recorded into an information recording medium, from the recording medium or to write information into the recording medium, an optical axis of the objective lens, which is for focusing a light beam emitted from a semiconductor laser as a light source on an information recording surface of the information recording medium, must be inclined at an appropriate angle with respect to the information recording surface.

For this reason, the pickup device is provided with a skew adjusting mechanism for adjusting an inclination of the optical axis of the objective lens in two directions, a radial direction and a tangential direction.

FIG. 8 is a side view showing a conventional pickup device is provided with the skew adjusting mechanism. A pickup device PU1 is formed with a lens holder 2 mounted on an objective lens 1, an actuator base 4 for supporting the lens holder 2 in a cantilever fashion by means of four 2-axes suspensions 3, which are equal in length, a plurality of adjusting screws 5 for adjusting an inclination of the actuator base 4, viz., an inclination of the optical axis of the objective lens 1, in a radial direction and a tangential direction, a pick-up case 6 for relatively slidably supporting the actuator base 4, and a pair of guide shafts 8 for supporting the pick-up case 6.

A protruded portion 4a having a part spherical surface is protruded from the lower surface of the actuator base 4 at a location, where the protruded portion 4a is supported in a recessed portion 6a formed in the pick-up case 6 while being slidable with the circumferential surface of the recessed portion 6a. Threaded holes 4b, while vertically passing through the pick-up case 6, are formed at predetermined positions closer to one end (the left side in the figure) of the actuator base 4. Those threaded holes 4b receive two adjusting screws 5 (one of which is omitted in the illustration), respectively. An urging-spring 7 is interposed between the other end (the right side in the figure) of the actuator base 4 and the pick-up case 6 such that it urges downwardly the other end of the actuator base 4.

In the skew mechanism thus constructed, the one end of the actuator base 4 with the objective lens 1 inserted therein is vertically adjusted by turning the adjusting screws 5, which pass through the pick-up case 6 and are threaded into the threaded holes 4b of the actuator base 4. By so doing, an inclination of the actuator base 4 to the pick-up case 6, viz., an inclination of the optical axis of the objective lens 1, is adjusted in the radial direction and the tangential direction so that the optical axis of the objective lens 1 is inclined at an appropriate angle with respect to an information recording surface of an information recording medium.

In the conventional pickup device PU1 thus constructed, it is necessary to separately manufacture the actuator base 4 and the pick-up case 6 in order to make a skew adjustment of the objective lens 1. Further, the number of parts, such as the adjusting screws 5 and the urging spring 7, which are to be assembled into the pickup device PU1, are increased. This results in increase of the size of the pickup device and increase of cost to manufacture the same. Further, the skew adjustment in which the actuator base 4 is biased in a desired direction while keeping the objective lens 1 in a floating state, is manually carried out by a skilled worker. As a result, the number of steps of manufacturing process is increased.

SUMMARY OF THE INVENTION

The present invention has been made to solve the problems of the conventional pickup device and has an object to reduce the number of component parts forming the pickup device and the size of the device, and to lighten the working load of the worker by simplifying the skew adjusting process.

To achieve the above object, there is provided a pickup device having a light source, an objective lens for converging rays of light emitted from the light source on a recording medium, a lens holder for holding the objective lens, and supporting means for movably supporting the lens holder.

The pickup device is improved in that a part of the objective lens and a part of the lens holder are movable relative to each other so as to adjust an inclination of an optical axis of the objective lens.

In the pickup device, a part of the objective lens and/or a part of the lens holder has a spherical surface.

Also, in the pickup device, the lens holder is provided with a contact portion which will be brought into contact with a manufacturing tool.

DETAILED DESCRIPTION OF THE PREFERRED EMBODIMENTS

Figure 1:
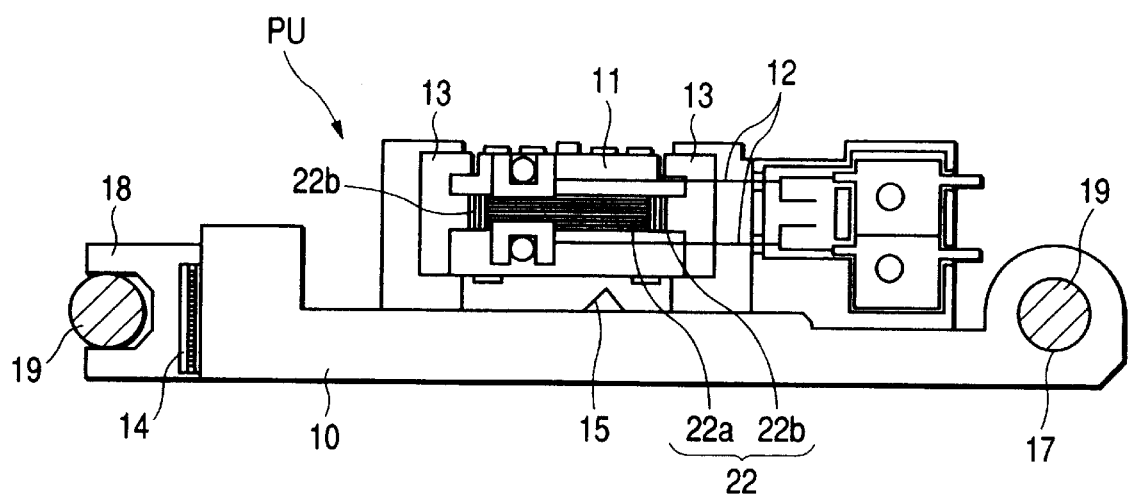
FIG. 1 is a side view showing a pickup device constructed according to the present invention.
Figure 2:
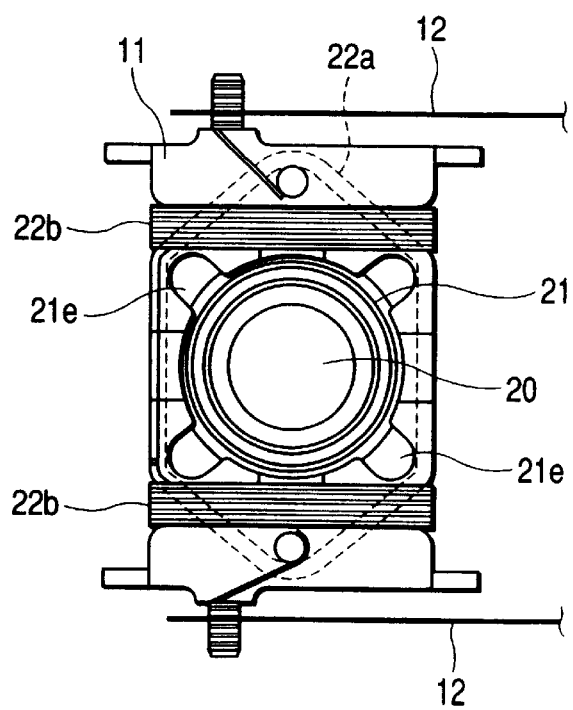
FIG. 2 is a plan view showing a lens holder used in the pickup device.
Figure 3:
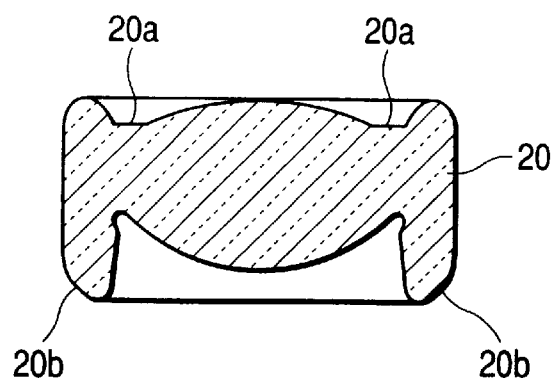
FIG. 3 is a sectional view showing an objective lens also used in the pickup device.
Figure 4:
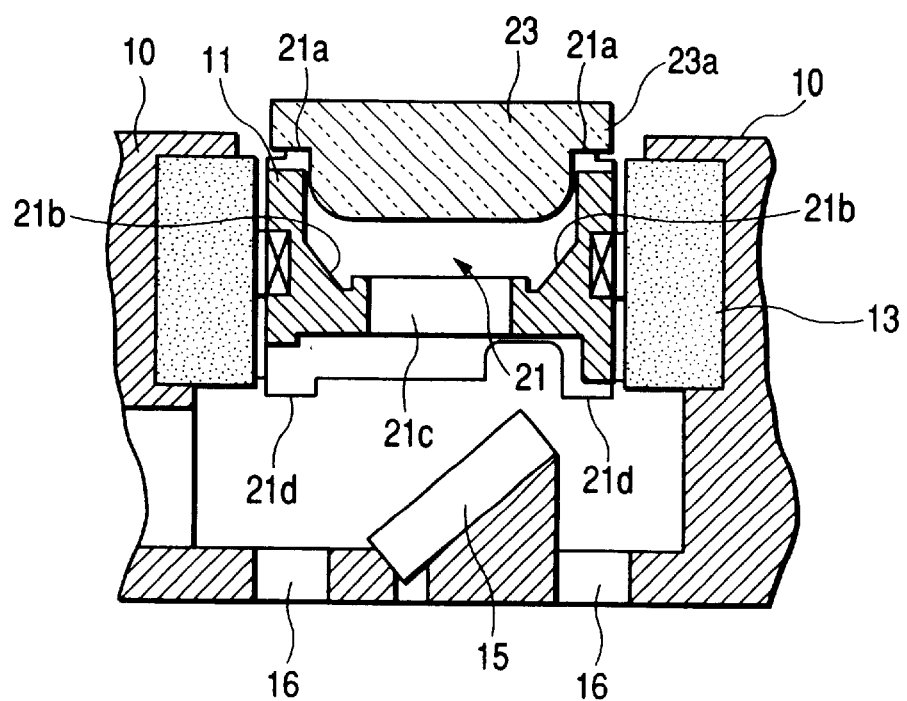
FIG. 4 is a cross sectional view showing a structure of the lens holder.

The preferred embodiments of the present invention will be described with reference to FIGS. 1 through 4. FIG. 1 is a side view showing a pickup device constructed according to the present invention. FIG. 2 is a plan view showing a lens holder used in the pickup device. FIG. 3 is a sectional view showing an objective lens also used in the pickup device. FIG. 4 is a cross sectional view showing a structure of the lens holder.

As shown in FIGS. 1 and 2, a pickup device PU is made up of a pick-up case 10 and a lens holder 11, both being made of synthetic resin, and four 2-axes suspensions 12 which interconnect the pick-up case 10 and the lens holder 11. The 2-axes suspensions 12 are equal in length and arranged in parallel to each other, and formed with metal-wire like members (e.g., wires, elongated plate springs or the like).

The 2-axes suspensions 12 as supporting means are coupled at the first ends to four corners of a predetermined location of the lens holder 11, and at the second ends to four corners of a predetermined location of one end of the pick-up case 10. With this structure, the lens holder 11 is supported in a cantilever fashion by the pick-up case 10, while being in a floating state. A couple of magnets 13 are oppositely disposed while the lens holder 11 is located between them, and such that each magnet is located between the pick-up case 10 and the lens holder 11 (see FIGS. 2 and 4).

A recess 21, while being positioned at a predetermined location, is formed in the center portion of the upper surface of the lens holder 11 supported by the 2-axes suspensions 12. The objective lens 20, which is used when information is read and written, is slidably put in the recess 21 (see FIGS. 2 and 4). Injection holes 21e are formed at four locations of the upper edge of the recess 21, each couple of those locations being oppositely disposed. Those injection holes 21e communicate with the gaps each between the side surfaces of the objective lens 20 and the recess 21 when the former is put in the latter (see FIG. 2).

The circumferential outer surface of the lens holder 11 is wound with an exciting coil 22, which includes a focus coil 22a and a tracking coil 22b (see FIGS. 1 and 2).

An upper reference surface 21a, which is smoothed to have a level plane, is formed on and along the circumferential upper edge of the recess 21. A circumferential outer edge 23a, which extends sideways from a dummy lens 23, is put on the upper reference surface 21a.

The dummy lens 23 is temporarily disposed in the upper part of the recess 21 of the lens holder 11 for measuring an inclination of the pick-up case 10. the upper end surface of the dummy lens 23 and the lower surface of the circumferential outer edge 23a are smoothed. The dummy lens 23 is somewhat lighter than the objective lens 20.

The recess 21 has a conical surface portion 21b which gradually reduces in diameter in the downward direction. When the objective lens 20 is put in the recess 21, the conical surface portion 21b is slidably supported on the part spherical portion 20b, which is formed on the circumferential outer surface of the lower part of the objective lens 20 (see FIG. 3). The upper surface of the objective lens 20 is processed to have a reflecting surface 20a, which is flat.

A hole 21c circular in cross section is formed in the bottom of the recess 21. The circular hole 21c having a predetermined diameter allows an optical axis to vertically pass therethrough.

Figure 5:
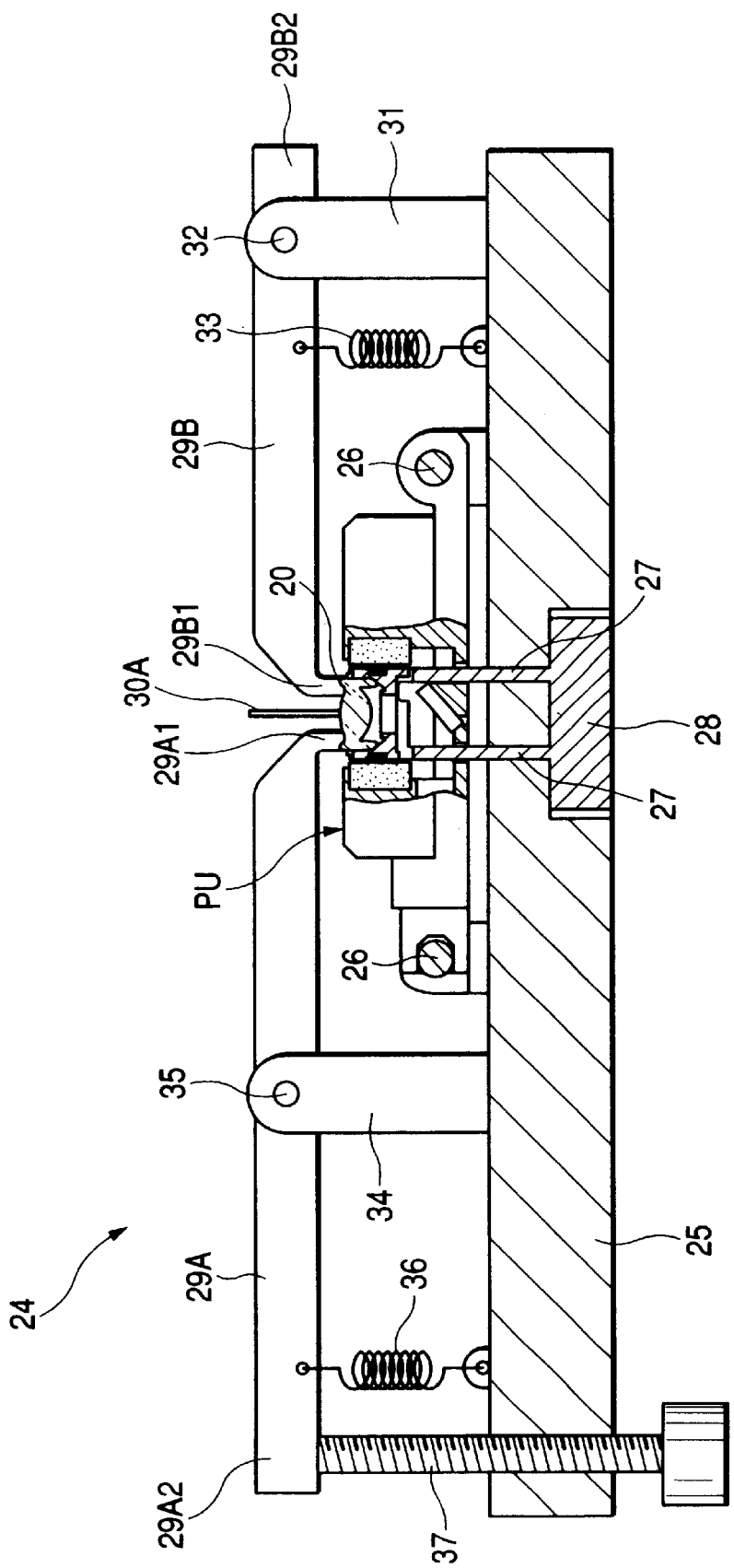
FIG. 5 is a side view, partly in section, showing the cased pickup device is fixedly mounted on the skew adjusting means.
Figure 7:
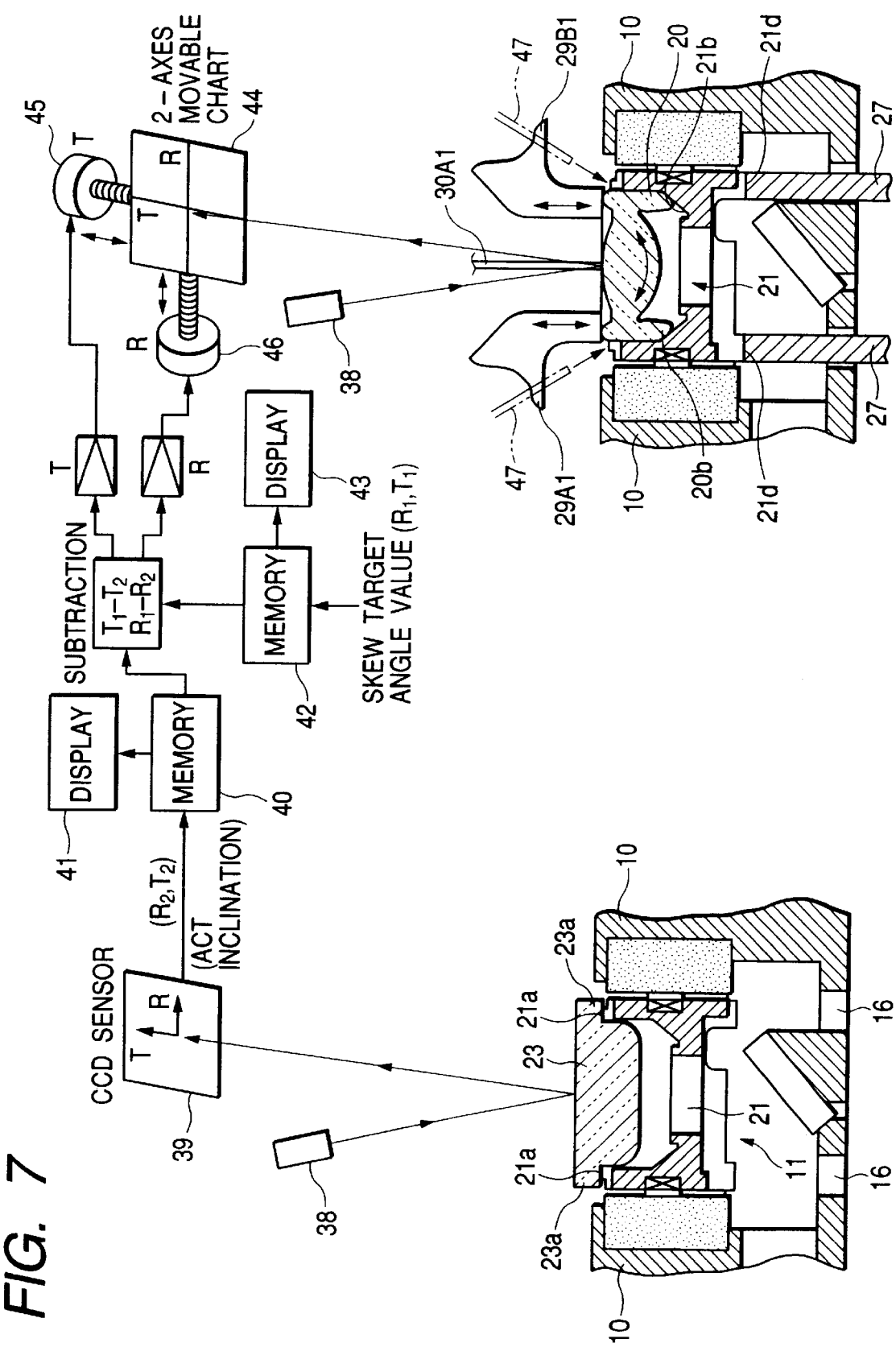
FIG. 7 is a diagram useful in explaining a skew adjustment of the objective lens by using the skew adjusting means.
Figure 8:
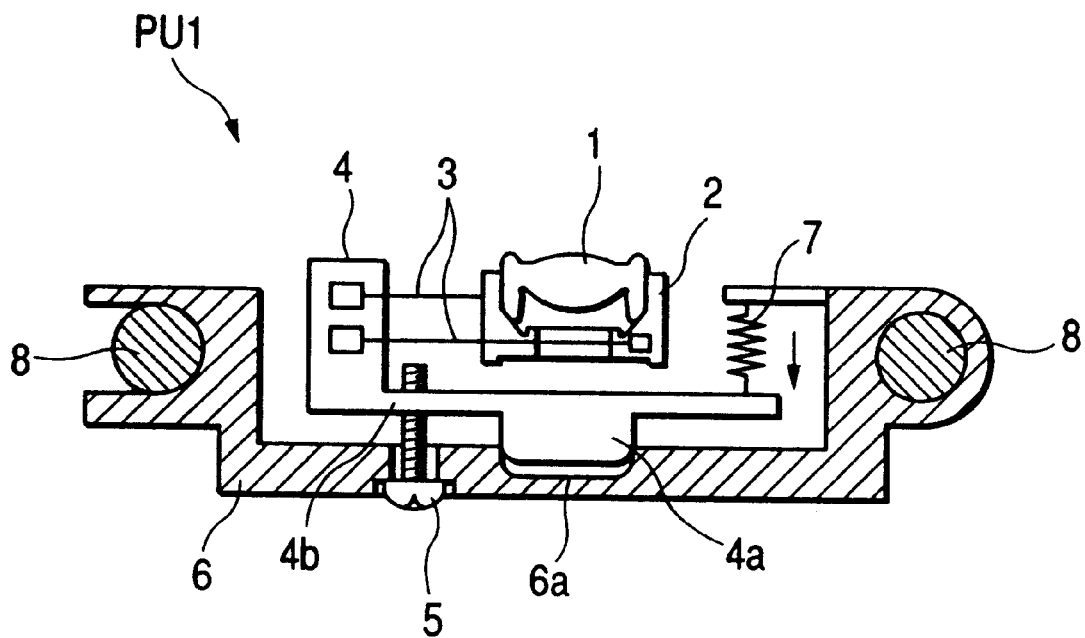
FIG. 8 is a side view showing a conventional pickup device is provided with the skew adjusting mechanism.

Lower reference surfaces 21d are provided at a plurality of predetermined locations (at least three locations; only two locations are illustrated in FIGS. 4, 5 and 7) on and along the circumferential edge of the lower end of the recess 21. Those lower reference surfaces 21d are smoothed so as to be on a level with each other. Reference pins 27 (see FIGS. 5 and 7) of a horizontal support 28 of a skew adjusting means 24 to be described later are pressed against and support the lower reference surfaces 21d. As a result, the lens holder 11 is supported while being inclined at an angle 0 with respect to a reference surface of the pick-up case 10, as will be described later.

A light receiving element 14 for receiving reflecting light from an information recording medium is located at one side (left side in the figure) of the pick-up case 10. A reflection mirror 15 is obliquely mounted on the pick-up case 10 at a location almost directly under the recess 21 of the lens holder 11 (see FIGS. 1 and 4). The reflection mirror 15 bends a light path of light emitted from a semiconductor laser (not shown) as a light source by 90°. Insertion holes 16 of predetermined diameters (only two holes are illustrated in FIG. 4) are vertically bored in the pick-up case 10 at at least three locations almost directly under the lower reference surfaces 21d of the recess 21. The reference pins 27, which contactually support the underside of the lens holder 11, pass through the insertion holes 16.

A guide hole 17 of a predetermined diameter and a sub-guide 18 are formed in the right and left sides of the pick-up case 10 when horizontally viewed in FIG. 1, respectively. The guide hole and the sub-guide receive a couple of parallel guide shafts 19, which are provided on a chassis of the information recording medium playback device, and are supported by them. In the skew adjustment, the guide hole and the sub-guide are supported with a pair of reference shafts 26, which are provided in the skew adjusting means 24, which will be described later.

The guide shafts 19 are arrayed in a direction in which the pickup device PU moves when information is recorded into or reproduced or played back from a recording surface of the recording medium, viz., in the recording/reproducing direction (radial direction) of the recording medium. With such a structure, the pick-up case 10, or the pickup device PU, is moved forward and backward in longitudinal directions of the guide shafts 19, and the pickup device PU is moved forward and backward in the recording/reproducing direction of the recording medium, whereby information is recorded into or reproduced from the recording medium.

Figure 6:
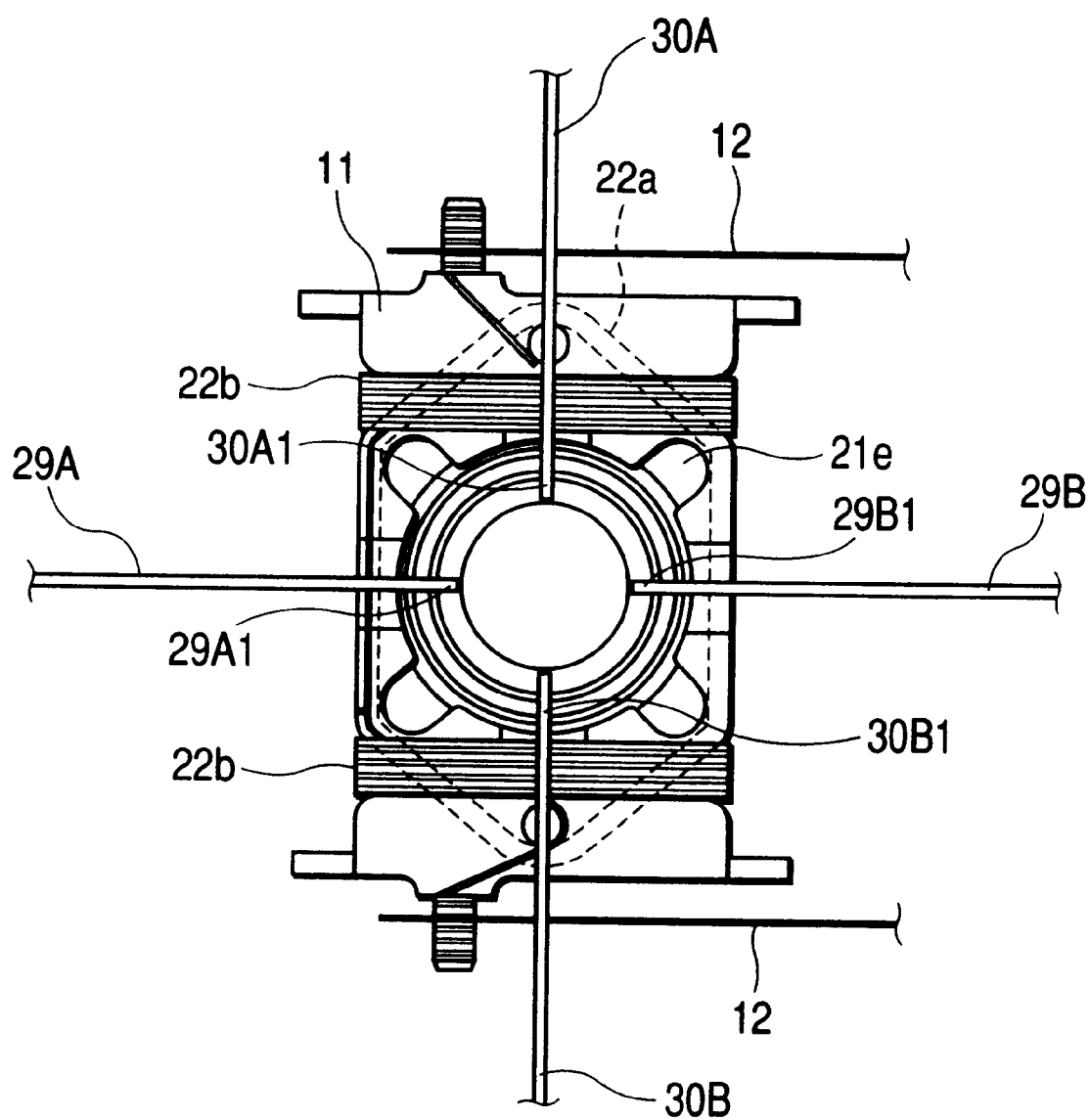
FIG. 6 is a plan view showing an objective lens in the structure shown in FIG. 5.

The skew adjusting means 24, which adjusts a skew of the objective lens 20 placed in the lens holder 11, will be described with reference to FIGS. 5 and 6. FIG. 5 is a side view, partly insection, showing the cased pickup device PU is fixedly mounted on the skew adjusting means 24. FIG. 6 is a plan view showing mainly the objective lens 20 in the structure of FIG. 5.

The skew adjusting means 24 is arranged such that an inclination of the lens holder 11 is automatically controlled by a control unit (not shown), and a skew of the objective lens 20 is manually adjusted. Abase table 25 of the skew adjusting means 24 is provided with a couple of reference shafts 26, which are used for fixedly mounting the pickup device PU. Those reference shafts 26 are inserted into the guide hole 17 and the sub-guide 18 of the pick-up case 10.

The paired reference shafts 26 are substantially equal in shape to the paired guide shafts 19, respectively. The shafts 26 are used for imitating a state that the pick-up case 10 is applied to the guide shafts 19 on the base table 25. Meanwhile, let a plane expanding in the axial directions of the paired reference shafts 26 or guide shafts 19 indicate a reference surface (referred to as a case reference surface) of the pick-up case 10.

The horizontal support 28 whose operation is controlled by the control unit is located at a predetermined position within the base table 25. A plurality of the reference pins 27 (at least three reference pins; only two of them are illustrated in FIGS. 5 and 7) stand erect on the upper surface of the horizontal support 28. When the horizontal support 28 lifts a predetermined distance, the tips of the reference pins 27 are brought into contact with the lower reference surfaces 21d of the lens, holder 11 of the pickup device PU, and support the lens holder 11 while forcibly putting the lens holder 11 in a horizontal state with respect to the case reference surface, so as to avoid the exertion of an excessive load onto the 2-axes suspensions 12.

Two pairs of adjusting levers 29A, 29B and 30A, 30B, as shown in FIGS. 5 and 6, are orthogonally disposed at predetermined positions on the upper surface of the base table 25 such that those pairs of the adjusting levers are orthogonal to each other at the center of the axis of the objective lens 20. In FIG. 6, the adjusting levers which horizontally extend are tangential adjusting levers 29A and 29B, and the adjusting levers which vertically extend are radial adjusting levers 30A and 30B.

Top ends 29A1 and 29B1 of the tangential adjusting levers 29A and 29B and top ends 30A1 and 30B1 of the radial adjusting levers 30A and 30B are brought into contact with the upper edge of the objective lens 20, which is located within the engaging part 21 of the objective lens 20.

The tangential adjusting lever pair is equal in construction to the radial adjusting lever pair, and those pairs are orthogonally provided in the skew adjusting means 24. Therefore, only the radial adjusting lever pair will typically be described.

A base end 29B2 of the tangential adjusting lever 29B, as shown in FIG. 5, is supported by a support member 31 that erects on the base table 25 so as to be turned about a fulcrum 32 of the support member 31. A spring 33 is interposed between the tangential adjusting lever 29B and the base table 25, and constantly urges the top end 29B1 of the tangential adjusting levers 29B to turn downward.

The tangential adjusting lever 29A is supported by a support member 34 standing upright on the base table 25 such that it may be turned in a swing manner at a fulcrum 35 provided at a mid position of the support member 34 as viewed in the extending direction of the support member. A spring 36 is interposed between the rear end 29A2 of the tangential adjusting lever 29A, and urges the rear end 29A2 to turn downward. The tip of an adjusting screw 37, which vertically moves the rear end 29A2 of the tangential adjusting lever, is in slidable contact with the underside of the rear end 29A2.

The top end 29A1 of the tangential adjusting lever 29A, which is opposite to the rear end 29A2, is adjusted in the vertical position by appropriately moving up and down the adjusting screw 37 relative to the rear end 29A2, which is urged to move downward by the spring 36.

Accordingly, an urging force of the top end 29A1 of the tangential adjusting lever 29A and an urging force of the top end 29B1 of the tangential adjusting levers 29B are relatively varied and adjusted, through the up and down movement of the adjusting screw 37, by way of the objective lens 20 slidably located in the recess 21 of the lens holder 11. As a result, a tangential inclination of the objective lens 20 is adjusted.

The radial adjusting levers 30A and 30B in the radial adjusting section are also provided with a radial inclination adjusting mechanism, which resembles the tangential inclination adjusting mechanism for the tangential adjusting levers 29A and 29B. An urging force of the top end 30A1 of the radial adjusting levers 30A and an urging force of the top end 30B1 of the radial adjusting levers 30B are relatively varied and adjusted, through the up/down movement of the adjusting screw (not shown) of the radial adjusting section, by way of the objective lens 20 slidably located in the recess 21 of the lens holder 11. As a result, a radial inclination of the objective lens 20 is adjusted.

Next, a skew adjustment of the objective lens 20 by using the skew adjusting means 24 will briefly be described.

When the pickup device PU is mounted on the information recording medium playback device, a skew adjustment of the objective lens must be carried out by tilting the objective lens 20 bya skew target angle component (R1, T1) of the objective lens with respect to the reference surface of the pick-up case 10 which extends in the axial direction of the paired guide shafts 19 to be inserted into the pick-up case 10, in order that no aberration is caused in the lens when information is recorded into and read out of the recording medium.

Here, the skew target angle components (R1, T1) of the objective lenses 20 are measured in advance by inspecting those objective lenses sampled from a molding lot of the objective lenses 20, by the utilization of a nature that the objective lenses 20 of one molding lot show an equal skew target angle component (R1, T1).

In the meantime, the lens holder 11 of the pickup device PU is inclined at an inclination angle containing an actuator inclination angle component (R2, T2) because of the warp of the 2-axes suspension per se, which cantilevers the lens holder 11, and the residual stress of the lens holder caused in assembling the pickup device PU. Incidentally, the actuator inclinations vary to each its own, and hence their values vary.

Accordingly, when the lens holder 11 is held while being forcibly put a horizontal state with respect to the case reference surface, by the reference pins 27, the inclination of the lens holder 11, viz., the inclination of the lens holder 11, is apparently corrected. Incidentally, the actuator inclinations vary every pickup device PU, and their values vary. For the above reason, with regard to an inclination of the reflecting surface 20a of the objective lens 20 when it is put in the lens holder 11 taking the horizontal attitude, a difference angle component (R1–R2, T1–T2) obtained by subtracting the actuator inclination angle component (R2, T2) from the skew target angle component (R1, T1) suffices for an adjusting target angle.

Incidentally, (Rn, Tn) represents angle components in the radial direction and the tangential direction.

The skew adjustment of the objective lens 20 by use of the skew adjusting means 24 will now be described on the basis of the brief description of the skew adjustment, with reference to FIG. 7. FIG. 7 is a diagram useful in explaining a skew adjustment of the objective lens by using the skew adjusting means 24.

All the objective lenses 20 of the actuator of the pickup device PU, which are contained in one modulating lot, are equal in the skew target angle component (R1, T1). Then, the skew target angle components (R1, T1) of the objective lenses 20 are measured in advance by the sampling inspection. The results of the sampling inspection are stored in a memory 42 of the control unit of the skew adjusting means 24, and displayed on the screen of a display unit 43.

Next, an actuator inclination angle component with respect to the case reference surface is measured.

The top ends 29A1 to 30B1 of the tangential adjusting levers 29A to 30B of the skew adjusting means 24 are set to be in a lifted state by a drive means (not shown), and the horizontal support 28 is made to descend to be in a standby state.

The pick-up case 10 to which the objective lens 20 or the dummy lens 23 is not yet set is located and fixed at a predetermined position on the base table 25 by the reference shafts 26.

The dummy lens 23 is mounted on the upper reference surface 21a of the recess 21 of the lens holder 11. Then, the 2-axes suspensions 12 which receive the weight of the dummy lens 23 sags and stands still in a balanced state. In this standstill state, a measuring laser light emitted from a laser diode 38 is radiated at a predetermined angle onto the upper surface of the dummy lens 23, and is reflected thereon. As a result, an inclination of the pick-up case 10, viz., the actuator, with respect to the case reference surface is measured. The measurement result of the actuator inclination is read as the actuator inclination angle component (R2, T2) of the radial and tangential directions, by a CCD (charge coupled device) sensor 39 of the control unit of the skew adjusting means 24. The thus gathered data is stored into a memory 40, and displayed on the screen of a display unit 41. After the measurement of the actuator inclination ends, the dummy lens 23 is removed from the lens holder 11.

An angle of the objective lens 20, which is put within the recess 21 of the lens holder 11, is adjusted on the basis of the skew target angle component (R1, T1) and the actuator inclination angle component (R2, T2).

When the horizontal support 28 being in a standby state is lifted by the control unit, the tips of the reference pins 27 progressively pass through the insertion holes 16 of the pick-up case 10, and come in contact with the lower reference surfaces 21d of the lens holder 11. When the horizontal support 28 is further lifted slightly, the lens holder 11, or the actuator, tilts, and it is held while being forcibly put apparently at an angle 0, or in the horizontal state, with respect to the case reference surface.

The objective lens 20 is put into the recess 21 of the lens holder 11 from which the dummy lens 23 was removed. In this state, measuring laser light emitted from the laser diode 38 is radiated at a predetermined angle onto the reflecting surface 20a of the objective lens 20. A back reflection light from the reflecting surface 20a is displayed on a 2-axes chart 44.

The 2-axes movable chart 44 is moved in advance by a tangential stepping motor 45 and a radial stepping motor 46, which move the 2-axes movable chart 44 in X- and Y-directions, so that an adjustment target value component (R1–R2, T1–T2), which was computed using a skew target angle component (R1, T1) that is stored in the memory 40 and an actuator inclination angle component (R2, T2) that is stored in the memory 42, are positioned at an origin (0, 0) on the 2-axes movable chart 44.

With this, when aback reflection light from the objective lens 20 reaches the origin (0, 0) on the 2-axes chart 44, a situation set up is equivalent to such a situation that an inclination angle of the reflecting surface 20a of the objective lens 20 with respect to the case reference surface is apparently adjusted to an intended skew target angle component (R1, T1).

In this state, the top ends 29A1 to 30B1 of the tangential adjusting levers 29A to 30B are moved downward and brought, by a given urging force, into sliding contact with the upper surface edge of the objective lens 20. Subsequently, the adjusting screw 37 in the tangential adjusting section and the adjusting screw in the radial adjusting section are manually turned, while being attendant with up/down motions thereof, by a worker so that the back reflection light from the objective lens 20 is positioned at the origin (0, 0) on the 2-axes movable chart 44. In this way, the inclination of the objective lens 20 is adjusted in the tangential and radial directions. That is, the skew adjustment is carried out.

In order to eliminate the necessity that the worker changes the adjusting target value every time the skew adjustment is carried out, the tangential stepping motor 45 and the radial stepping motor 46 are automatically operated, every skew adjustment, in accordance with an actuator inclination proper to each lens holder, to thereby slide the 2-axes movable chart 44 in the X- and Y-directions, and the worker carries out the skew adjustment of the objective lens so that the back reflection light from the objective lens 20 always returns to the origin on the 2-axes movable chart 44.

The worker turns the respective adjusting screws to move them up and down and positions the back reflection light at the origin (0, 0) on the 2-axes movable chart 44. As a result, movable nozzles 47 are positioned substantially right above the injection holes 21e of the recess 21 in a state that the objective lens 20 is held with the top ends 29A1 to 30B1 of the tangential adjusting levers 29A to 30B. Then, ultraviolet curing adhesive is ejected, by predetermined amounts, from the tips of the movable nozzles 47 and injected into the injection holes 21e, and enters and fills a gap between the recess 21 and the objective lens 20. Thereafter, the movable nozzles 47 are retracted, and the recess 21 and the objective lens 20 are irradiated with ultraviolet rays, to thereby bond together the recess 21 and the objective lens 20.

After the ultraviolet curing adhesive is completely cured, the top ends 29A1 to 30B1 of the tangential adjusting levers 29A to 30B are moved apart from the objective lens 20, while the horizontal support 28 is moved apart from the lens holder 11.

Measuring laser light that is emitted from the laser diode 38 is radiated at a given angle onto the reflecting surface 20a of the objective lens 20 coupled to the lens holder 11, which is cantilevered with the 2-axes suspensions 12, and is reflected by the objective lens 20, whereby an inclination of the objective lens 20 of the objective lens 20 being coupled to the lens holder 11 is measured. The measured value is compared with the skew target angle component (R1, T1) to check as to whether or not the skew adjustment of the objective lens 20 was exactly carried out. If it is exactly carried out, the skew adjustment of the objective lens 20 ends.

The skew-adjustment sliding structure in which the circumferential outer edge of the lower side of the objective lens 20 is spherically shaped, and the conical surface portion 21b is formed on the recess 21 of the lens holder 11 is used in the embodiment. In an alternative, the objective lens 20 having a spherical shaped surface is combined with the lens holder 11 also having a spherical shaped surface. In another alternative, the objective lens 20 having a spherical shaped surface is combined with the lens holder 11 having at least three coupling, slanted faces. In yet another alternative, the objective lens 20 having a given radial surface is combined with the lens holder 11 having a spherical shaped surface.

Another adhesive, e.g., thermoplastic adhesive may be used in lieu of the ultraviolet curing adhesive is used for adhesive in the embodiment.

As was seen from the foregoing description, in the pickup device of the invention, the objective lens and the lens holder are slidably held. Therefore, only the objective lens may be biased with respect to the lens holder, which is supported while being forcibly put in a horizontal state. Accordingly, an easy skew adjustment is secured. Further, in the pickup device, the pickup case and the actuator base are constructed in a unitary form, and the 2-axes suspensions are directly fixed to and supported by the pick-up case. Therefore, there is no need of assembling the skew mechanism including the urging spring and the adjusting screws into the pickup device, while the conventional pickup device needs such assembling. This leads to reduction of the number of component parts and of the device size.

When a skew adjustment of the objective lens mounted on the pickup device is carried out, a skew target angle proper to the objective lens is measured, and a dummy lens and to measure an actuator inclination angle is mounted. To make a skew adjustment of the objective lens put in the lens holder, which is supported while being forcibly put in a horizontal state, based on those measured values, a worker merely positions a reflecting light from the objective lens at the origin on the 2-axes movable chart on the basis of the measured values. Therefore, the setting at the adjusting target value is easy, so that a mistaken measurement is prevented, and high precision skew adjustment is secured. The work load of the work is lessened, and further the number of manufacturing steps is reduced.

What is claimed is:

1. A pickup device comprising:

a light source;

an objective lens for converging rays of light emitted from said light source on a recording medium;

a lens holder for holding said objective lens; and supporting means for movably supporting said lens holder;

wherein a part of said objective lens and a part of said lens holder are movable relative to each other so as to adjust an inclination of an optical axis of said objective lens; and wherein an opening through which a manufacturing tool passes to perform adjustment of said inclination is formed in said supporting means.

2. A pickup device according to claim 1, wherein apart of said objective lens and/or a part of said lens holder has a spherical surface.

3. A pickup device according to claim 1, wherein said lens holder is provided with a contact portion which will be brought into contact with a manufacturing tool.

4. A pickup device comprising:

an objective lens;

a lens holder for holding said objective lens; and supporting member for movably supporting said lens holder;

wherein a part of said objective lens and a part of said lens holder are movable relative to each other so as to adjust an inclination of an optical axis of said objective lens; and wherein an opening through which a manufacturing tool passes to perform adjustment of said inclination is formed in said supporting member.

5. The pickup device of claim 4, wherein said manufacturing tool passes through the opening of the supporting member when a contact portion of the lens holder and the manufacturing tool are in contact with each other.

* * * * *